Oct. 23, 1928.                                                1,689,004
                      C. S. ACKLEY
                APPARATUS FOR WAVING HAIR
                   Filed March 26, 1925
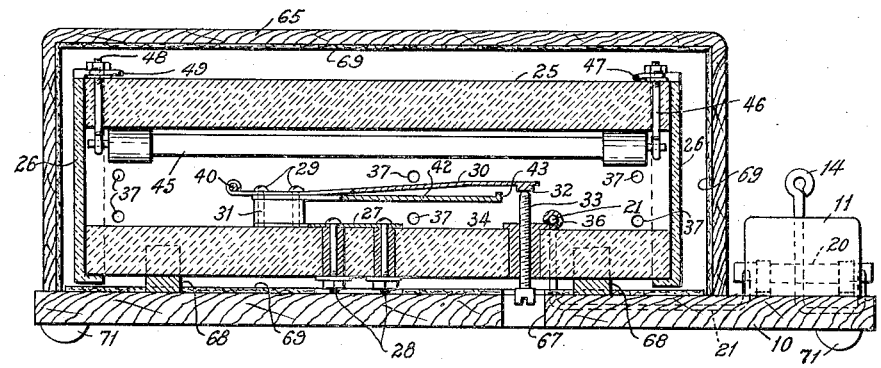
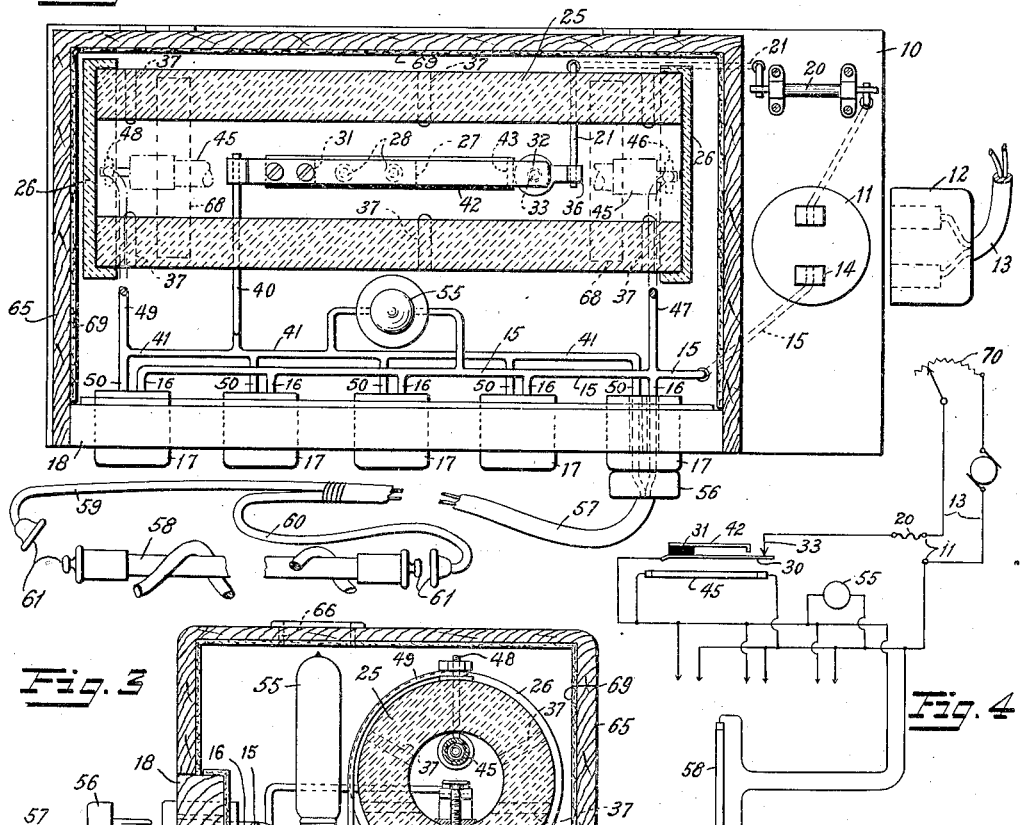
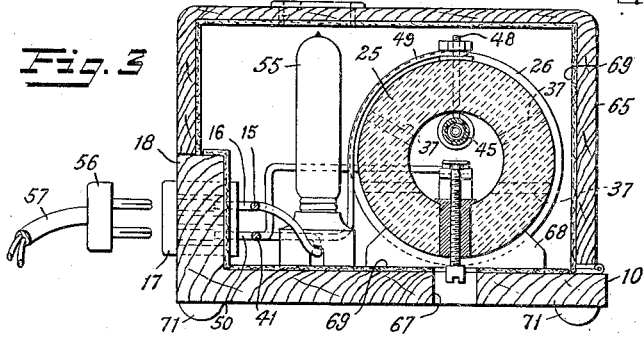
INVENTOR
Charles S. Ackley
BY
Marshall Hawley
ATTORNEYS.

Patented Oct. 23, 1928.

1,689,004

UNITED STATES PATENT OFFICE.

CHARLES S. ACKLEY, OF NEW YORK, N. Y.

APPARATUS FOR WAVING HAIR.

Application filed March 26, 1925. Serial No. 18,349.

This invention relates to apparatus for curling or waving hair.

The invention relates more particularly to apparatus of the character specified so constructed that a plurality of curling or waving devices can be connected thereto and operated simultaneously. With apparatus of this kind, it is very important that the temperature of the waving devices be so regulated that they will be maintained hot enough to effectively perform their function but not at such a temperature as to burn the hair.

This invention has for its salient object to provide apparatus so constructed and arranged that the temperature of the curling or waving devices will be automatically controlled and all of the devices will be maintained at the same and most effective operating temperature.

Another object of the invention is to provide apparatus of the character described so constructed and arranged that the user can detect at a glance whether the heating circuit is open or closed or, in other words, whether or not the waving devices are being heated.

Another object of the invention is to provide hair waving apparatus that is simple in construction, can be economically manufactured and will operate on the ordinary lighting circuit.

Further objects of the invention will appear from the following specification taken in connection with the drawings, which form a part of this application, and in which Fig. 1 is a sectional elevation of apparatus constructed in accordance with the invention.

Fig. 2 is a sectional elevation taken at right angles to Fig. 1.

Fig. 3 is a vertical sectional elevation taken at right angles to Figs. 1 and 2, and Fig. 4 is a wiring diagram showing circuits for the various parts of the apparatus.

The invention briefly described consists of apparatus adapted to be connected to the ordinary lighting circuit or to any other source of supply and comprising a plurality of terminals or sockets adapted to be connected to a plurality of waving devices. Each of the waving devices consists of a tubular member having a high resistance heating wire therein adapted for connection to the socket of the apparatus. Means is provided for automatically controlling the temperature of the heating devices and in the particular embodiment of the invention shown, this means includes what may be termed a master heater mounted to coact with a thermostatic temperature control device so arranged that when the temperature of the master heater is raised to a predetermined extent the thermostatic device or switch will open the heating circuit, thereby preventing the hair waving devices from being overheated. When the temperature of the master heater and of the waving devices falls below a predetermined temperature, the circuit is again closed and the waving devices will again be heated. Means has also been provided in conjunction with the apparatus for indicating to the user whether the heating circuit is open or closed. In the particular form of the invention shown, this indicating means consists of a lamp connected across the circuit in such a manner that the lamp will be lighted when the heating circuit is closed and will be extinguished when the circuit is opened. Further details of the invention will appear from the following description.

The apparatus illustrated in the drawings may be connected to the ordinary electric lighting circuit or to any other source of supply and in the form of the invention illustrated, this apparatus is mounted on a base 10 and has a terminal plug 11 adapted to be connected by a socket 12 and cable 13 to any desired source of electric power.

One of the terminals 14 of the plug 11 is connected to a wire 15 which in turn is connected by leads 16 to one of the terminals of a plurality of sockets 17 mounted in a longitudinally extending wall 18 which is connected to the base 10.

The other terminal 14 of the plug 11 is connected preferably through a fuse 20 to a wire 21. The wire 21 is connected to the thermostatic switch in the following manner.

The switch is preferably mounted in a tubular casing 25 formed of asbestos or similar material, the ends of the casing being closed by caps 26. The switch comprises a base 27 secured by bolts 28 to the tube 25 and connected by screws 29 to a switch contact 30 formed of a resilient metal strip such as a bronze strip. A block 31 of insulating material is interposed between the base 27 and the contact strip 30. If desired, the block and base may be made integral. The free end 32 of the contact strip is adapted to make contact with an adjustable screw 33 which is threaded into a metallic bushing 34 carried by the tube 25 and having an extension 36 connected to the wire 21 above mentioned. The tubular casing 25 is preferably provided with ventilating openings 37.

The other end of the contact strip 30 is connected by a wire 40 to a conduit 41.

The thermostatic switch also includes a strip 42 of thermostatic metal having its free end 43 disposed beneath the free end portion of the contact strip 30.

The thermostatic switch is controlled by means of a master heater 45 also disposed in the tube 25 and connected at one end by an adjustable connector 46 to a wire 47 which in turn is connected to the wire 15. The opposite end of the master heater 45 is connected by an adjustable connector 48 to a wire 49 which in turn is connected to the wire 41.

The wire 41 is also connected by leads 50 to the other terminals of the sockets 17.

In order to indicate to the user whether the circuit is on or off a lamp 55 is connected across the wires 15 and 41.

Each of the sockets 17 is adapted to receive a plug 56 which is connected by a conduit 57 to a hair waving device 58. In the particular form of the invention shown, the two wires 59 and 60 of the circuit to the heating device are adapted to be connected by suitable connectors 61 to the opposite ends of the waving devices 58.

Each of the waving devices 58 and also the master heater 45 has enclosed therein a high resistance wire such as a nichrome wire and the current passing through this wire brings the wire to a high temperature, thereby heating the devices.

The various parts of the apparatus mounted on the base 10 are preferably enclosed by a cover 65 having an opening 66 in the top thereof to permit the user to see whether or not the lamp 55 is lighted. An opening 67 is also provided in the base 10 to permit adjustment of the contact screw 33. Any suitable form of mounting for the tube 25 may be used and in the form of the invention shown, the tube is mounted in brackets 68 secured to the base. A lining 69 of asbestos may be used on the base and cover.

The base 10 preferably has supporting knobs or projections 71 to permit air to enter through opening 67 and cover 65 through the opening 66.

The circuit through the various parts of the apparatus may be traced as follows. From one terminal 14 of the plug 11 the current passes through the wire 15 and thence through the leads 16 to the sockets 17. From the other terminal 14 of the plug the current passes through the fuse 20 to the wire 21 which leads to the adjustable contact screw 33 and thence through the contact strip 30 and lead 40 to the conduit 41 which in turn is connected by leads 50 to the other terminals of the sockets 17. The master heater 45 is connected across the wires 15 and 41 by wires 47 and 49 respectively. The lamp 55 is also connected across the wires 15 and 41.

When the temperature of the master heater is raised to a predetermined degree, the thermostatic element 42 will be raised thereby and will break the contact between contact strip 30 and the adjustable contact 33 thereby opening the circuit. When the circuit through the switch is opened, this will break the circuit through the wire 41, thereby disconnecting the waving devices from the source of power. When the master heater and the waving devices are cooled to a predetermined extent, the thermostatic element will permit the contact strip 30 to again complete the circuit and the devices will again be heated. When the circuit is opened, the lamp 55 will be extinguished and when the circuit is closed the lamp will be lighted.

If desired, as shown in Fig. 4, a variable resistance 70 may be utilized to regulate the current passing through the apparatus.

It will be understood that any desired number of waving devices may be utilized in connection with the apparatus above described and by reason of the master heater, the temperature of all of the waving devices is regulated in such a manner that the most effective operating temperature is maintained. Since the waving devices are connected in multiple and the lamp is also connected in multiple, the lamp will indicate to the user whether or not the current is on regardless of the number of waving devices in use.

Any desired form of hair waving device may be utilized in connection with the apparatus above described but the preferred form consists of a metallic tube having a high resistance heating wire therein and preferably covered with absorbent material which will be saturated with suitable liquid when the device is to be used.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. Apparatus for waving hair comprising a plurality of heating devices, an electric circuit for conducting current to said devices, means for automatically controlling the temperature of said devices, and means for indicating whether or not current is passing through said circuit.

2. Apparatus for waving hair comprising a plurality of heating devices, an electric circuit for conducting current to said devices, means for automatically controlling the temperature of said devices and an electrically operated device in said circuit for indicating whether or not current is passing through said circuit.

3. Apparatus for waving hair comprising a plurality of heating devices, an electric circuit for conducting current to said devices, a master heater in said circuit and a thermostatic switch in the circuit controlled by the master heater and adapted to open and close said circuit and thereby regulate the temperature of the heating devices.

4. Apparatus for waving hair comprising a plurality of heating devices, an electric circuit for conducting current to said devices, a master heater in said circuit, a thermostatic switch in the circuit controlled by the master heater and adapted to open and close said circuit and thereby regulate the temperature of the circuit, and means for indicating whether or not current is passing through said heating devices.

5. Apparatus for waving hair comprising a plurality of heating devices, an electric circuit for conducting current thereto, a master heater in said circuit and means controlled by the temperature of said master heater for opening or closing said circuit.

6. Apparatus for waving hair comprising a plurality of electrical connectors, each connector being adapted for connection to a hair waving device, an electrical circuit connected to said connectors, a master heater in said circuit and means controlled by said master heater for opening and closing said circuit.

7. Apparatus for waving hair comprising a plurality of electrical connectors, each connector being adapted for connection to a hair waving device, an electrical circuit connected to said connectors, a master heater in said circuit and a thermostatic switch associated with said master heater for opening and closing said circuit.

8. Apparatus for waving hair comprising a plurality of electrical connectors, each connector being adapted for connection to a hair waving device, an electrical circuit connected to said connectors, a master heater in said circuit, means controlled by said master heater for opening and closing said circuit, and a signal device in said circuit for indicating to the user of the apparatus whether the circuit is open or closed.

9. In combination, a plurality of heating devices, an electric circuit for conducting current to said devices, a master control heater connected in said circuit, and a thermostatic switch in said circuit associated with and controlled by said master control heater and adapted to open and close said circuit and thereby regulate the temperature of the heating devices.

10. In combination, a plurality of heating devices, an electric circuit for conducting current to said devices, said heating devices being connected in parallel in said circuit, a master control heater connected in parallel in said circuit and a thermostatic switch connected in series in said circuit associated with and controlled by said master control heater and adapted to open and close said circuit and thereby regulate the temperature of the heating devices.

11. In combination, a plurality of heating devices, an electric circuit for conducting current to said devices, said heating devices being connected in parallel in said circuit, a master control heater connected in parallel in said circuit, a thermostatic switch connected in series in said circuit associated with and controlled by said master control heater and adapted to open and close said circuit and thereby regulate the temperature of the heating devices, and means connected in parallel across the circuit for indicating whether or not current is passing through said circuit.

12. In combination, a plurality of heating devices, an electric circuit for conducting current to said devices, means in said circuit for automatically opening and closing the circuit, thereby regulating the temperature of said devices, and means in said circuit for indicating whether or not current is passing through said circuit.

13. In combination, a plurality of heating devices, an electric circuit for conducting current to said devices and means in said circuit for automatically opening said circuit when the heating devices reach a predetermined maximum temperature and for automatically closing the circuit when the devices reach a predetermined minimum temperature.

14. Apparatus for waving hair comprising a plurality of independent hair waving devices, an electric circuit for conducting current to said devices, a master control heater connected in said circuit, a thermostatic switch in said circuit associated with and controlled by said master control heater and adapted to open and close said circuit and thereby regulate the temperature of the heating devices, an electrically operated device in said circuit for indicating whether or not said thermostatic switch is in open or closed position.

In witness whereof, I have hereunto set my hand this 24th day of March, 1925.

CHARLES S. ACKLEY.